United States Patent [19]

Brandt, Jr.

[11] 4,161,119

[45] Jul. 17, 1979

[54] PNEUMATIC FLOW MEASURING SYSTEM

[75] Inventor: Robert O. Brandt, Jr., Garner, N.C.

[73] Assignee: Brandt Industries, Inc., Fuquay-Varina, N.C.

[21] Appl. No.: 883,537

[22] Filed: Mar. 6, 1978

[51] Int. Cl.² ............................ G01F 1/42; G06G 5/00
[52] U.S. Cl. ............................... 73/205 R; 235/200 PF
[58] Field of Search ............... 73/205 R; 235/200 PF, 235/200 R

[56] References Cited

U.S. PATENT DOCUMENTS

| | | | |
|---|---|---|---|
| 2,494,781 | 1/1950 | Stover | 73/205 |
| 2,978,907 | 4/1961 | Stover | 73/205 X |
| 3,239,141 | 3/1966 | Best | 235/200 |

*Primary Examiner*—Herbert Goldstein
*Attorney, Agent, or Firm*—Mills & Coats

[57] ABSTRACT

The present invention relates to a pneumatic flow measuring system for measuring fluid flow. More particularly, the disclosed preferred embodiment of the present invention is referred to as a square root extractor as the device basically functions to compute the square root of a pneumatic input signal by producing an output signal that is linear with flow or fluid velocity of a system being measured. Thus, although flow between two points may be basically defined as a square root function of a differential pressure between the same two points, the flow measuring device of the present invention utilizes a differential pressure input signal to produce an output signal that is linear with flow.

13 Claims, 1 Drawing Figure

PNEUMATIC FLOW MEASURING SYSTEM

The present invention relates to instrumentation, and more particularly to a pneumatic fluid flow measuring and/or control system for effectively measuring and indicating the rate of fluid flow through a system of moving fluid.

BACKGROUND OF THE INVENTION

Fluid flow in a moving system of fluid is basically a square root function of differential pressure. Traditionally, fluid flow has been measured by determining the differential pressure between two points and essentially converting differential pressure to fluid flow. Typically, a differential pressure signal can be directed to a pressure gauge and a fluid flow scale may be provided on the pressure gauge where the indicator arm of the pressure gauge will be utilized to indicate fluid flow on the flow scale. Thus, for any given differential pressure, the pressure gauge will indicate flow. Because flow is a square root function of differential pressure, it follows that the flow scale associated with the pressure gauge is not linear. Thus it follows that the accuracy and precision of such a device at the lower end of the scale is not as great as the accuracy and precision at the upper end of the scale.

Moreover, conventional pneumatic instrumentation used to measure fluid flow has typically been provided with an amplifier valve of the type including mechanical linkages, levers, bellows, and other moving parts. Such amplifiers including mechanical linkages and moving parts are often sensitive to vibration and mounting position, and accordingly this gives rise to inaccuracy and imprecision. In addition, conventional instrumentation for measuring fluid flow are known to be relatively slow in response time with over shoot or "bobbling" on the output.

SUMMARY OF INVENTION

The present invention entails an apparatus for measuring air flow wherein an output signal is produced that is linear with flow being measured. In particular, a differential pressure signal is produced from the system being measured by a conventional transmitter and this differential pressure signal effectively acts as an input to the apparatus for linearizing flow. The input signal is fed through an orifice and through a capillary network to produce a signal that represents flow in the system being measured. In the preferred embodiment a two stage orifice and capillary network are utilized. The output of the first orifice and capillary network is not to the 0.5 power, but closer to the 0.75 power. To obtain the 0.5 power, the output of the first network is directed into the second orifice and capillary network. Each capillary network is particularly designed so as to have a Reynolds member of less than 2000 and to be of a character such that flow through the complete orifice and capillary network is linear with differential pressure. Therefore, since the pressure drop through an orifice is a function of the square of flow, and since a capillary network can be designed wherein the pressure drop therein is linear with flow, it follows that the output of the capillary network of the present invention is linear with flow.

Consequently, with appropriate calibration the flow measuring apparatus or system of the present invention can receive a differential pressure signal from a system of air or fluid and produce a pneumatic output signal that is linear with flow of the system of air or fluid being measured. It is, therefore, seen that although flow is a square root function of differential pressure, that the apparatus of the present invention is adapted to effectively compute the square root of a differential pressure signal and for any given flow to produce an output signal that is linear with the flow of a particular system of air or fluid being measured.

It is, therefore, an object of the present invention to provide a pneumatic flow measuring device that will effectively produce a pneumatic output signal that is linear with flow of a system of fluid being measured.

Another object of the present invention is to produce a flow measuring instrument that is adapted to receive an input signal corresponding to a differential pressure existing in a system of air and to produce a pneumatic output signal that is linear with flow in that system of air, such that for any given increase or decrease in flow within said system, results in a pneumatic output signal that is linear with flow. Consequently, flow can be read from a linear scale associated with the flow measuring instrument and wherein the accuracy and precision of the instrument is generally constant over the full range of the scale.

Another object of the present invention is to provide a flow measuring instrument of the basic character set forth above wherein the instrument is a solid state device and is insensitive to vibration and mounting position.

Still a further object of the present invention is to provide an air flow measuring instrument of the type referred to above that can be easily factory calibrated in order that minimum set-up time is required.

In addition, a further object of the present invention resides in the provision of a flow measuring instrument that is highly accurate, durable, and reliable.

Another object of the present invention is to provide a flow measuring instrument that is provided with means for sealing the output of the instrument.

Finally, an object of the present invention is to provide a flow measuring device which is exactly or nearly exactly critically damped so that the instrument responds quickly but without any appreciable overshoot or "bobbling" on the output.

Other objects and advantages of the present invention will become apparent from a study of the following description and the accompanying drawings which are merely illustrative of the present invention.

DESCRIPTION OF PREFERRED EMBODIMENT

Figure 1:
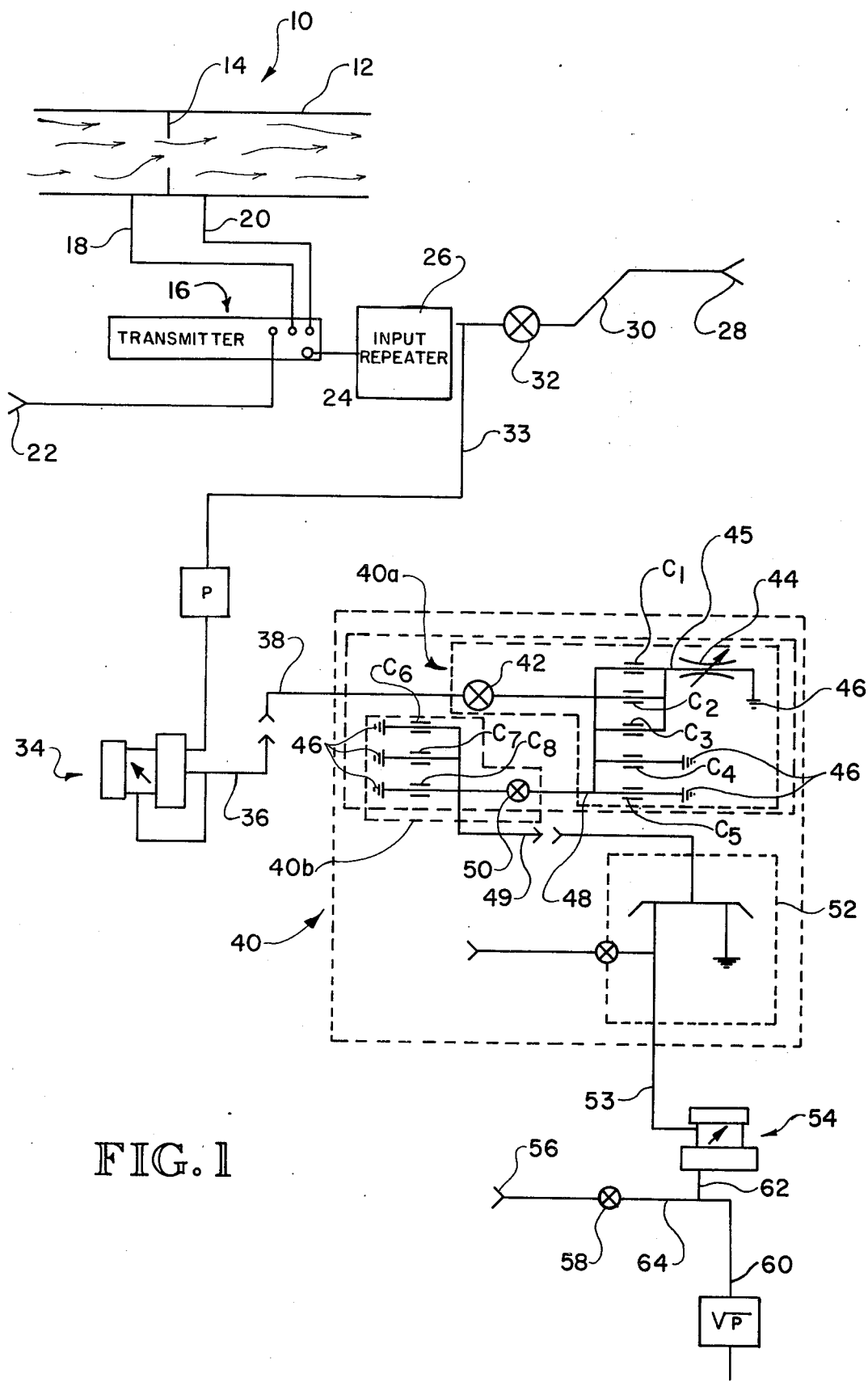
FIG. 1 is a diagrammatic illustration of the flow measuring instrument of the present invention.

With further reference to FIG. 1 of the drawing, the flow measuring instrument of the present invention and associated components is shown therein. As illustrated, the flow measuring instrument or device of the present invention is adapted to measure flow of a system of moving fluid indicated generally by the numeral 10. In describing the preferred embodiment of the instrument of the present invention, it will be described as an air flow measuring instrument, but it will be understood that the same could be used to measure the flow in any fluid system.

Viewing FIG. 1, a system of moving air 10 is shown to be confined within a counduit 12 that is provided with a flow restricting device or orifice 14 disposed interiorly thereof. As the air flows from left to right, as viewed in FIG. 1, the air must flow through orifice 14 and consequently there is a differential pressure drop across the orifice.

To determine the differential pressure drop across orifice 14, there is provided a differential transmitter, indicated generally by the numeral 16 which is adapted to sense differential pressure. It should be pointed out that there are numerous conventional and commercially available primary elements that are commercially available to sense and measure differential pressure. In the case of the preferred embodiment, it should be pointed out that it is contemplated that one such suitable device is a differential transmitter produced and sold by Brandt Industries, Inc., located at Triple W Air Park, Box 302, Fuquay-Varina, North Carolina 27526. This differential transmitter is referred to as a 2000 series differential pressure transmitter and is identified by Brandt Industries, Inc., by Specification Sheet No. 4750-S2. A detailed discussion of this differential pressure transmitter is not dealt with herein because such is well known in the art and is not per se material to the present invention. However. briefly reviewing this type of differential transmitter it is seen that the same includes two input lines 18 and 20, one line being conventionally referred to as the low input line and the other being referred to as a high input line. In addition, the differential pressure transmitter is connected to an air supply 22 which is typically 20 psi and this supply is directed into the transmitter 16. Finally, an output line 24 is connected to the transmitter 16 and this output line is adapted to receive a pneumatic output signal from the transmitter 16 that is related to the differential pressure across the orifice 14 in the air system 10.

Operatively connected to output line 24 is a conventional input repeater device 26. Input repeater 26 is associated and operatively related to an air supply 28 which is typically 20 psi. From air supply 28, air is directed through line 30, through orifice 32 and on through line 33. As will be appreciated from the prior art, the input repeater 26 functions to effectively generate or control an input signal through line 33 that is related to the output pneumatic signal from transmitter 16 that is directed to the input repeater 26 through line 24. Therefore, the air signal flowing in line 33 effectively becomes the input signal to the air flow measuring device of the present invention and is controlled and is a direct response of the differential pressure output signal from the transmitter 16.

Line 33 is directed to an input subtraction unit, indicated generally by the numeral 34. The input subtraction unit is a conventional pneumatic air pressure subtraction unit that is commerically available and in the case of the present invention is adapted to subtract a predetermined number of pounds from the air pressure being directed therethrough. In a contemplated embodiment of the present invention, the supply pressure in line 33 would range from 3 to 15 psig. The input subtraction is adapted to have an output range of 0 to 12 psig and, therefore, the same is adapted to subtract 3 psig.

From the input subtraction unit 34, an output line 36 is communicatively connected to an input line 38 that directs a supply of air from the subtraction unit 34 into a synthesizer network indicated generally by the numeral 40. The synthesizer network 40 is comprised of two stages, a first stage indicated generally by 40a and a second stage indicated generally by 40b. First stage 40a includes an orifice 42 connected in line 38 prior to the provision of a series of capillary tubes or conduits connected in parallel relationship, the capillary tubes or conduits being referred to by $C_1$, $C_2$, $C_3$, $C_4$, $C_5$.

Still referring to the first stage 40a, a variable flow restricter 44 is provided in line 45 prior to an atmospheric outlet 46 which forms the terminal end of line 45. In addition, as in the embodiment illustrated in FIG. 1, the lines of the first stage 40a having capillaries $C_4$ and $C_5$ also have a terminal atmospheric exhaust 46 provided therein. Consequently, it is appreciated that the volumetric flow of air through the first stage 40a is reduced by atmospheric exhaustion prior to entering the second stage 40b.

Capillary line 48 is communicatively connected between the first stage 40a and the second stage 40b so as to allow air passing through the first stage 40a to pass on to second stage 40b.

Viewing second stage 40b, it is seen that the same includes an orifice 50 through which air passes, and a series of capillaries $C_6$, $C_7$, and $C_8$, each capillary in this stage being disposed in parallelly relationship to the others. As in the case with the first stage, the second stage 40b is provided with atmospheric exhaust, denoted by the numeral 46, which allows air passing through the capillaries $C_6$, $C_7$, and $C_8$, to be exhausted, thereby reducing the volumetric air flow that passes through the second stage 40b into other components of the synthesizer network 40.

From second stage 40b, fluid passing therethrough is directed through outlet line 49 into a conventional high gain amplifier, denoted by the numeral 52, which is adapted to return the original pressure input signal to a 12 pound span, namely, 0 to 12 psig. Details of the high gain amplifier 52 is not dealt with herein because such is known in the art and is presently commercially available. For a complete and unified understanding of such a high gain pneumatic amplifier, one is referred to the disclosure in U.S. Pat. No. 3,844,529, the disclosure thereof being expressly incorporated herein by reference.

From high gain amplifier 52, the output thereof is directed through line 53 to a zero adjust unit, indicated generally by the numeral 54, which acts as an output addition, and in the present embodiment is adapted to add 3 pounds to the 12 pound span such that the output from the zero adjust unit 54 ranges from 3 to 15 psig.

The output signal results from an air supply 56 directed through orifice 58 into line 64. Air passing through line 64 merges with air passing through line 62 from the zero adjust unit 54 to move out the output 60. The air flow moving through output 60 is the output signal which is a signal that is linear with air flow or velocity of the system of air moving through conduit 12.

Reviewing the operation of the air flow measuring device of the present invention, it is seen that a pneumatic input pressure signal is directed through line 33, through the subtraction unit 34, and into inlet line 38 of the synthesizer network 40. The pneumatic input signal directed through line 33 is representative of the differential pressure existing across the orifice 14 in the system of moving air 10. It is noted that a conventional transmitter 16 is utilized to sense the differential pressure across the orifice 14 and to accordingly produce an output pressure signal through line 24 thereof to the input repeater 26 which in effect controls the input signal originating from supply 28, through orifice 32, into line 33.

Thus the input pressure signal entering line 38 relates to and is a function of air flow within system 10. But the velocity or air flow of the air in system 10 is a function of the square root of the differential pressure across orifice 14 or the differential pressure signal in line 24 or line 33. By reversing the situation, i.e., directing the input pressure signal or a signal representative thereof, through another orifice network, results in the air flow through this latter orifice network being a function of the square root of the initial pressure differential in system 10.

Within the synthesizer network 40, an orifice and capillary network is provided in the form of the two stages, 40a and 40b discussed hereinabove. The synthesizer network which is of an orifice-capillary type, is specifically designed such that flow therethrough is linear with differential pressure. This entails specifically designing the capillary network, including capillaries $C_1$ through $C_8$, by crimping, bending, sizing, etc., such that the Reynolds number of the capillaries is less than 2000. With this specific design of the capillaries within the synthesizer network, the flow therethrough is generally linear with differential pressure.

In designing the particular embodiment illustrated in FIG. 1, it was found that a two stage orifice-capillary network would be an appropriate design. In such a design, the output of the first stage was not to the 0.5 power, but was approximately to the 0.75 power. To obtain the 0.5 power, the operation was designed to be carried out in two stages, with the particular orifices and capillaries selected such that the output of the two stage synthesizer 40 would give an output reflecting the 0.5 power.

Therefore, the output of the two stage orifice-capillary network results in a pneumatic signal that is generally linear with air flow within the air system 10. Consequently, the output of the high gain amplifier 52 and particularly the output 60 is a pneumatic signal that is linear with air flow in system 10 over the complete range of operation.

In the present case, it is contemplated that the air flow measuring device would be adapted to generate an output having a 12 pound span. In the preferred embodiment illustrated herein, it is contemplated that the input signal in line 33 would vary from 3 to 15 psig. The subtraction unit 34 would be adapted to subtract 3 psig from each end of the scale such that the input pressure signal in line 38 would be an input pressure signal of 0 to 12 psig.

The zero adjust unit 54 would be adapted to add an additional 3 pounds to each end of the scale such that the output would be 3 to 5 psig.

It is, therefore, appreciated that the air flow measuring device of the present invention effectively computes the square root of an input pneumatic pressure signal. Thus the output of the synthesizer network 40 and the output signal through 60 is linear with the input signal, and, therefore, this output signal can be utilized as a linear expression of air flow throughout the range of the instrument. It is, therefore, recognized that the present invention has unique advantages over the prior art because the instrument of the present invention does not utilize mechanical linkages and consequently the square root extractor is insensitive to vibration or mounting position. In addition, the design of the present invention is such that an output is produced which is exactly or nearly exactly critically damped which effectively maximizes response time with no overshoot or "bobbling" on the output. Since the synthesizer network follows a theoretical square root curve, high accuracies and high flow turn downs are possible.

In addition, it is appreciated that the flow measuring instrument of the present invention has the additional advantage of having the capability of scaling the output. This can be accomplished by adjusting either the variable resistor 44, orifice 42, or orifice 50, or any combination thereof.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced herein.

What is claimed is:

1. A pneumatic instrument for measuring flow and effectively extracting the square root of a pneumatic input signal, comprising: input means for directing a pneumatic input signal to said instrument; a synthesizer network forming a part of said instrument and communicatively connected to said input means for directing a pneumatic input signal to said instrument such that pneumatic input signals to said instrument are directed to said synthesizer network; said synthesizer network including orifice and capillary means connected in series and communicatively connected to said input means such that pneumatic input signals directed through said input means to said synthesizer network are directed through said orifice and capillary means; means within said synthesizer network and associated with said orifice and capillary means for causing the pressure drop across a portion of said orifice and capillary means to be generally linear with flow therethrough; and output means operatively associated with said synthesizer network and communicatively connected to said capillary means for directing air from said synthesizer network such that the air moving therefrom becomes an output pneumatic signal that is linear with the flow being measured.

2. The pneumatic instrument of claim 1 wherein said orifice and capillary means comprises a first stage having an orifice and a capillary network, and a second stage having a second orifice and a second capillary network, and wherein said first and second stages are communicatively connected such that air may move from said first stage to said second stage.

3. The pneumatic instrument of claim 2 wherein both said first and second stages includes means for venting to the atmosphere portion of flow through each stage.

4. The pneumatic instrument of claim 1 wherein said synthesizer network is provided with an amplifier, with said amplifier being communicatively connected to the output of said orifice and capillary means such that the flow signal exiting said orifice and capillary means is amplified.

5. The pneumatic instrument of claim 1 wherein said capillary means are particularly shaped and directed such that they have a Reynolds number less than 2000.

6. The pneumatic instrument of claim 1 wherein said orifice and capillary means comprises a first stage having a first orifice and a first capillary means and a second stage having a second orifice and second capillary means, and wherein said capillary means of both stages are particularly shaped and directed so as to give rise to a Reynolds number of less than 2000.

7. The pneumatic instrument of claim 6 wherein said first and second stages are communicatively connected in series and wherein the capillary means of each stage includes a series of capillary units disposed in parallel relationship.

8. The pneumatic instrument of claim 7 further including a subtraction unit associated with the input means of said instrument for subtracting a certain pressure value from the input to said instrument; and a zero adjust unit operatively connected about the output of said instrument for adding generally the same pressure value to the output as was subtracted by said subtraction unit.

9. A pneumatic square root extractor instrument for measuring flow by receiving an input pressure signal representative of the differential pressure across any dynamic head meter within a system of air and providing an output signal that is linear with air flow in said system, said pneumatic square root extractor instrument comprising: input pressure signal means for directing an input pressure signal representative of differential pressure of a system of air being measured to said instrument; a synthesizer network associated with said instrument for receiving said input pressure signal; said synthesizer network including orifice means and capillary means connected in series and communicatively connected to said input pressure signal means for allowing said input pressure signal to flow therethrough; means associated with said orifice means and said capillary means for controlling flow through said orifice means and said capillary means such that the flow therethrough is generally linear with the pressure drop through said orifice means and said capillary means; and output means associated with said instrument and communicatively connected with said capillary means of said synthesizer network for directing the output flow from said orifice means and said capillary means from said instrument, wherein said output flow is a linear representation of air flow in the system of air being measured.

10. The pneumatic square root extractor instrument of claim 9 wherein said means for controlling flow through said orifice means and capillary means includes means for shaping and directing said capillary means such that the Reynolds number thereof is less than 2000, thereby giving rise to a case where flow through said capillary means is generally linear with the pressure dropped therethrough.

11. The pneumatic square root extractor instrument of claim 10 wherein said orifice means and said capillary means of said synthesizer network is comprised of a first stage having a first orifice means and a first capillary means comprised of a series of individual capillary units, and a second stage comprised of a second orifice means and second capillary means including a series of individual capillary units; and wherein said first and second stages are communicatively connected such that flow may be directed from said first stage to said second stage.

12. The pneumatic square root extractor instrument of claim 11 wherein said synthesizer includes an amplifier associated therewith, said amplifier being communicatively connected to the second stage of said synthesizer network for amplifying the output signal thereof.

13. The pneumatic square root extractor instrument of claim 12 wherein said instrument is further provided with a subtraction unit associated with said input means of said instrument for subtracting a certain pressure value from any input pressure signal; and a zero adjust unit operatively connected about the output of said instrument for essentially adding a pressure value corresponding to the pressure value subtracted by said subtraction unit.

* * * * *